Sept. 11, 1923.
H. P. TIMM
DRAFT COUPLING FOR TRACTORS
Filed April 18, 1922
1,467,519
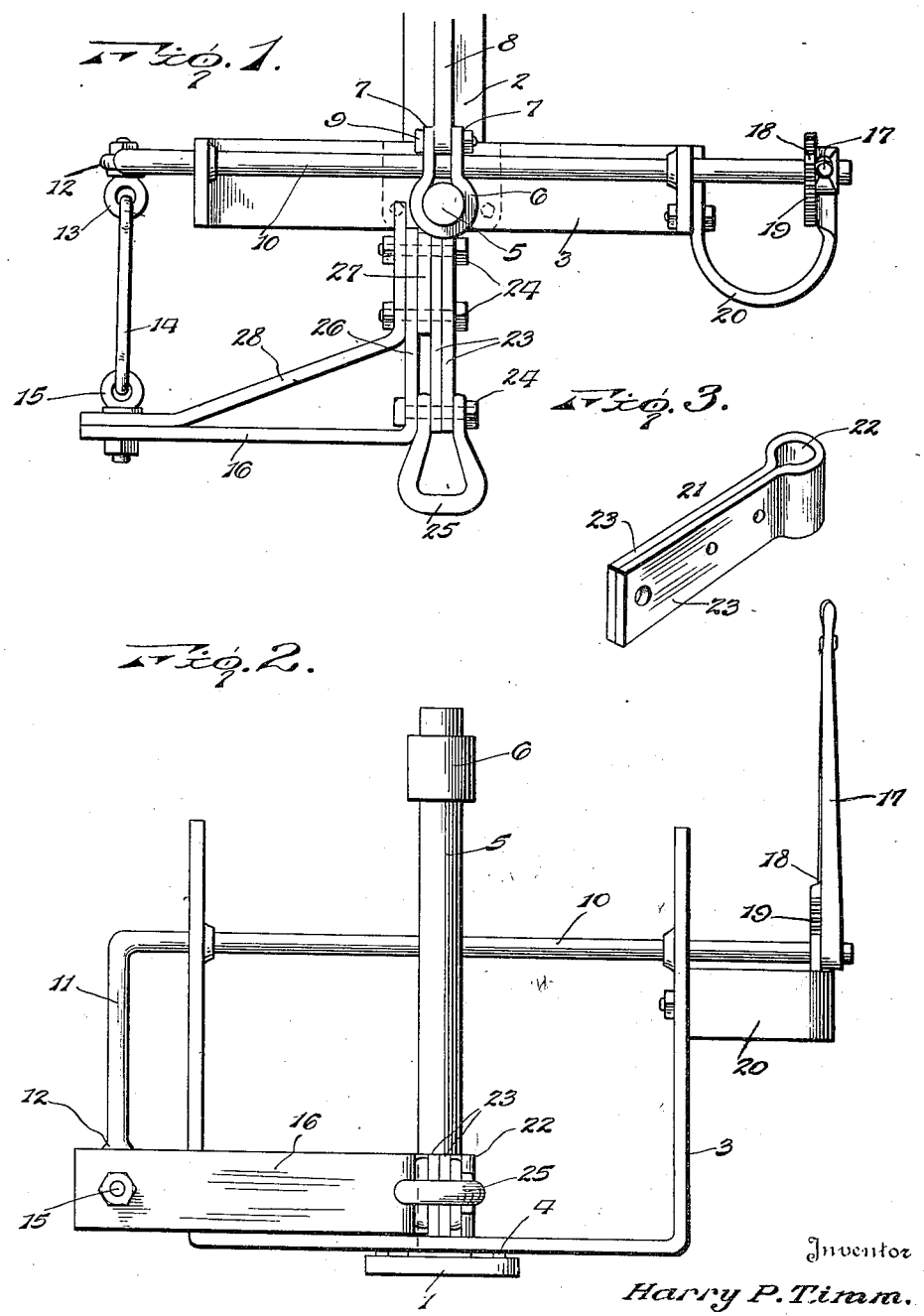

Patented Sept. 11, 1923.

1,467,519

UNITED STATES PATENT OFFICE.

HARRY P. TIMM, OF BENNINGTON, NEBRASKA.

DRAFT COUPLING FOR TRACTORS.

Application filed April 18, 1922. Serial No. 554,638.

*To all whom it may concern:*

Be it known that I, HARRY P. TIMM, a citizen of the United States, residing at Bennington, in the county of Douglas and State of Nebraska, have invented certain new and useful Improvements in Draft Couplings for Tractors, of which the following is a specification.

My invention has for its object the provision of simple, strong and efficient means for coupling an agricultural implement to a tractor and permitting adjustment of the coupling whereby to shift the position of the implement according to the topography of the ground. The invention is illustrated in the accompanying drawings and will be hereinafter fully set forth.

In the annexed drawings—

Figure 1 is a plan view of my improved draft coupling;

Fig. 2 is a rear elevation thereof;

Fig. 3 is a detail perspective view of the draw bar member of the coupling.

Tractors are now generally provided with a draw bar at their rear ends, and I have illustrated the said draw bar conventionally at 1 in the accompanying drawings, a portion of the rear end of the tractor being indicated at 2. In carrying out my invention, I employ a U-shaped frame 3 which is extended across the draw bar 1 and is secured thereto by bolts indicated at 4 and inserted through the base of the said frame and through the holes now provided in the draw bar for the attachment of plows or other implements. Rising through the base of the frame 3 and having its lower end slightly spread so as to rest upon the draw bar 1 and be prevented from rising through the frame 3 is a king bolt or main sustaining rod 5, the upper end of which is engaged in an eye or collar 6 which is split and provided with lugs 7 adapted to pass at opposite sides of a rib 8 upon the tractor, a bolt 9 being inserted through the said lugs and the said rib, as clearly shown in Fig. 1, whereby to secure the collar to the tractor and maintain the bolt or rod 5 in an upright position. Journaled in the side members of the frame 3 near the upper ends thereof is a rock shaft 10 which has one end formed into or equipped with a crank 11 which normally extends vertically downward and is provided at its free end with an eye 12. Secured in the said eye 12 is an eye bolt 13 which receives the front end of a link 14, the rear end of said link being engaged in an eye bolt 15 which is secured in the free end of a bracing and shifting arm 16. At the end of the rock shaft 10 remote from the crank 11, I secure to said shaft a hand lever 17 by which the shaft may be rocked so as to adjust the coupling. This lever is equipped with the usual latch 18 co-operating with a rack 19 formed on the upper edge of a U-shaped supporting arm or frame 20 secured to and projecting laterally from the adjacent side of the frame 3, as clearly shown.

The main draft member or draw bar 21 consists of a heavy strap or flat bar doubled upon itself at its center to provide an eye 22 which is fitted loosely about the lower end of the king bolt 5 and rests upon the base member of the U-shaped frame 3. The ends or leaves 23 of the draw bar are brought together and project rearwardly from the eye 22 and are secured together by bolts 24 inserted through openings provided therefor. To the rear ends of the leaves 23, I secure a clevis or draft hook 25 which may be engaged with the draft member at the front end of the plow or other implement, as will be understood. The arm 16 is disposed laterally with respect to the draw bar and has a forwardly extending side plate 26 which is disposed parallel with the leaves 23 of the draw bar, as shown clearly in Fig. 1, and receives the bolts 24, a spacer 27 being disposed between the rear end of the side member 26 and the draw bar, while the front end of the said member 26 bears against one side of the clevis 25. A bracing member 28 is disposed diagonally across the angle defined by the arm 16 and its side terminal 26 and is secured to the same, as clearly shown in Fig. 1, so that a very strong structure will result.

In the use of my device, the plow or other implement is connected to the clevis or draft hook 25, as stated, in the usual manner and the tractor is then driven over the field. It frequently becomes necessary to shift the plow with respect to the line of draft so that it will not skid or otherwise depart from the line which it is desired to have the furrow follow, especially when working upon a hillside. Heretofore, this shifting of the plow or other implement could only be accomplished manually and cause great delay in the tilling of the ground as well as subjecting the operator to inconvenience and considerable labor. By the use of my device, it is not necessary to stop the progress of the tractor, but by shifting the hand lever 17 forwardly or rearwardly, the shaft 10 will be rocked and movement will be transmitted from the crank 11 to the shifting arm 16 and thence to the draw bar so that the draw bar will be moved pivotally about the king bolt and the clevis or draft hook 25 will be shifted to the right or to the left of the central line of the tractor. The extent to which the draw bar may be thus pivotally swung will depend primarily upon the length of the link 14 and the crank 11 and, if desired, these parts may be provided in various lengths so that the user may employ the particular device which is best suited to his purpose. When the rock shaft 10 has been properly set, the latch 18 will hold it in the set position so that the plow or other implement will be held to the desired path. The construction described and illustrated produces a very strong device and in all positions will effectually withstand the strain imposed thereon by the implement which is being worked. The device may be applied to any tractor at a very low cost and is not apt to get out of order but, barring accidents, will remain in operative condition for an indefinite period.

Having thus described the invention, what is claimed as new is:

In a draft coupling for tractors, the combination of a supporting frame adapted to be secured to a tractor, a king bolt rising through the said frame, a draw bar mounted at its front end upon the king bolt for pivotal movement, a draft member secured to the rear end of the draw bar, a shifting arm secured to and extending laterally from the outer end portion of the draw bar, a rock shaft mounted transversely upon the supporting frame, a crank at one end of the rock shaft, a link connection between the crank and the shifting arm, said connection being pivotally joined to both the crank and the shifting arm and means for setting the rock shaft.

In testimony whereof I affix my signature.

HARRY P. TIMM. [L. S.]